United States Patent
Clift

(10) Patent No.: US 8,984,053 B2
(45) Date of Patent: Mar. 17, 2015

(54) HOME NETWORK CONTROLLER WITH REMOTE USER INTERFACE WRAPPER OF DISCOVERED MULTIMEDIA CONTENT

(71) Applicant: Sony Corporation, Tokyo (JP)

(72) Inventor: Graham Clift, Poway, CA (US)

(73) Assignee: Sony Corporation, Tokyo (JP)

( * ) Notice: Subject to any disclaimer, the term of this patent is extended or adjusted under 35 U.S.C. 154(b) by 204 days.

(21) Appl. No.: 13/644,097

(22) Filed: Oct. 3, 2012

(65) Prior Publication Data
US 2014/0095585 A1    Apr. 3, 2014

(51) Int. Cl.
*G06F 15/16*    (2006.01)
*H04L 12/28*    (2006.01)

(52) U.S. Cl.
CPC ................... *H04L 12/2803* (2013.01)
USPC ........................................................ 709/203

(58) Field of Classification Search
CPC ....................... A63F 2300/209; H04L 12/2803
USPC ........................................................ 709/203
See application file for complete search history.

(56) References Cited

U.S. PATENT DOCUMENTS

| | | |
|---|---|---|
| 2003/0084449 A1 | 5/2003 | Chane et al. |
| 2007/0005727 A1* | 1/2007 | Edwards et al. ............... 709/218 |
| 2008/0046943 A1 | 2/2008 | Colsey et al. |
| 2009/0205008 A1 | 8/2009 | Wollmershauser et al. |
| 2010/0131848 A1* | 5/2010 | Friedlander et al. .......... 715/719 |
| 2010/0198860 A1 | 8/2010 | Burnett et al. |
| 2010/0211636 A1 | 8/2010 | Starkenburg et al. |
| 2010/0254370 A1 | 10/2010 | Jana et al. |
| 2011/0103374 A1 | 5/2011 | Lajoie et al. |

FOREIGN PATENT DOCUMENTS

GB    WO 2012073027 A2 *    6/2012

* cited by examiner

*Primary Examiner* — Yves Dalencourt
(74) *Attorney, Agent, or Firm* — John L Rogitz

(57) ABSTRACT

A home networked controller device leverages discovery and control services to improve interoperability between devices that share multimedia content by re-serving the content wrapped in a remote user interface to enable client devices that have the capability to play the content but that require a remote user interface to be present.

8 Claims, 1 Drawing Sheet

HOME NETWORK CONTROLLER WITH REMOTE USER INTERFACE WRAPPER OF DISCOVERED MULTIMEDIA CONTENT

I. FIELD OF THE INVENTION

The present application pertains generally to home network controllers with remote user interface wrapper of discovered multimedia content.

II. BACKGROUND OF THE INVENTION

Home network discovery and control is encapsulated in a variety of standards such as Zeroconf, universal plug-n-play (UPnP), and Airplay. UPnP is an example of a technology that offers a very flexible architecture for managing connectivity of devices that share remote user interfaces and multimedia in the home. Digital living network architecture (DLNA) standardizes this by adding media formats and specific transport protocols to the basic UPnP devices. As understood herein, however, complexity arises when trying to combine the following two opposing scenarios. One is when a content server expects content selection to be part of a remote user interface that is delivered along with the multimedia playback functionality to the client. In this case, the client need only discover and connect to the remote user interface service for the content to be made available. In contrast, the situation may arise in which an application with its own user interface resides on the client that discovers the selection of available content from available services on the home network and presents them to the user. Complexity arises when a content server delivers some of its content bundled together with a remote user interface and some of it is expected to be discovered independently by clients. As a consequence, the user of the client device is potentially faced with navigating through their devices menu system to switch applications to search and playback the different content sources in their home. In addition, each multimedia capable application may have diverse capabilities that lead to frustration when content that is played one way, e.g., through the remote user interface, doesn't work when played another way, e.g., through independent media player application.

SUMMARY OF THE INVENTION

Present principles recognize that ideally, the client user experience should be unified through one approach.

Accordingly, a controller has a processor and a computer readable storage medium accessible to the processor and bearing instructions executable by the processor to configure the processor to adapt different sources of content to a client device on a network through a single user interface (UI) provided by the controller to the client device to transparently enable the client device to also receive content for playback that was initially presented without a remote UI.

The controller may be embodied by the client device or may be physically separate from the client device. The controller processor may also transform multimedia content into content which is wrapped in the remote UI such that multimedia content is embedded in the remote UI. The controller combines discovery functionality for discovering multimedia content with remote UI serving device functionality so that playback of the multimedia content is achieved on client service applications that only handle multimedia content offered as part of a remote UI. In example implementations, the remote UI is a discoverable web browser with audio video (AV) playback. The server may provide the remote UI in one example, whereas in another example the server provides no remote UI and provides only AV content, and the controller stores the remote UI, discovers the AV content on the server, and wraps a content list representing the content in the remote UI prior to providing the remote UI to the client device. The content list may be derived by the controller from the content discovered on the server by the controller.

In another aspect, a controller includes a processor and a computer readable storage medium accessible to the processor to configure the processor to execute discovery of a server of audio video (AV) content and a client device configured to play the AV content. The server does not source a remote user interface (UI) to the client device. The controller processor discovers AV content on the server and then provides, in a remote UI at the controller, a list of AV content on the server. The controller delivers the remote UI with the content list wrapped therein to the client device.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
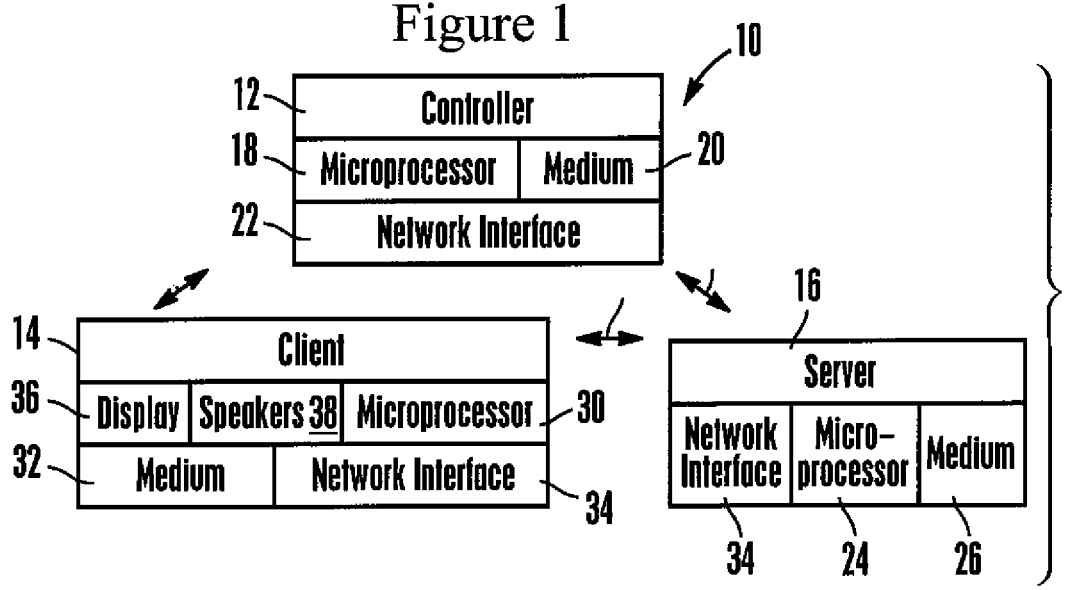
FIG. 1 is a simplified block diagram of an example client device and an example server.

Referring initially to FIG. 1, a system is shown, generally designated 10, which includes a controller 12 according to present principles communicating in a local network such as a home network using, e.g., DLNA, with one or more client devices 14 such as TVs and one or more multimedia servers 16, which may be established by any appropriate serving device such as a disk player, personal video recorder, and the like.

The controller 12 includes one or more processors 18 accessing one or more computer readable storage media 20 such as disk-based or solid state storage to cause the processor 18 to execute logic described herein. The controller 12 also includes one or more network interfaces 22 such as wired or wireless modems, Ethernet ports, universal serial bus (USB) ports, Bluetooth transceivers, etc. to support communication in the network among the devices.

The server 16 includes one or more processors 24 accessing one or more computer readable storage media 26 such as disk-based or solid state storage to cause the processor 24 to execute logic described herein. The server 16 also includes one or more network interfaces 28 such as wired or wireless modems, Ethernet ports, universal serial bus (USB) ports, Bluetooth transceivers, etc. to support communication in the network among the devices.

The client device 14 includes one or more processors 30 accessing one or more computer readable storage media 32 such as disk-based or solid state storage to cause the processor 30 to execute logic described herein. The client 14 also includes one or more network interfaces 34 such as wired or wireless modems, Ethernet ports, universal serial bus (USB) ports, Bluetooth transceivers, etc. to support communication in the network among the devices. Typically, the client device 14 outputs video on a display 36 and outputs audio on speakers 38. The client device may be a TV, a game console, a laptop or slate computer, a home theater system, or other client device that typically establishes a "sink" for playing high definition multimedia interface (HDMI) content received from a HDMI source such as the server 16. Note that while the figures herein show separate client devices 14, controller 12, and server 16, the controller 12 in some embodiments may be embodied in the client device 14 or the server 16.

According to present principles, the controller 12 adapts different sources of content to the devices 14 and services on the network and manages these through a single user interface provided by the controller with the specific aim of transparently enabling clients with remote user interface capability to also receive content for playback that was initially presented without a remote user interface. The controller may be embodied in a remote device such as a tablet computer or smartphone, or as mentioned above it could be part of the client device 14.

According to present principles, multimedia such as audio-video content is transformed by the controller 12 into content which is wrapped in a remote user interface (UI). In other words, multimedia content is embedded in a remote UI. In so doing, the functionality provided by a control point, such as an UPnP control point, for discovering multimedia content is uniquely combined with the functionality offered by a remote UI serving device so that playback can be achieved on client service applications that only handle multimedia content offered as part of a remote UI.

An example is a discoverable web browser with audio video (AV) playback. In this case, the AV is enabled in the browser through elements of a remote UI service (e.g., the browser application) that is served to it.

Figure 2:
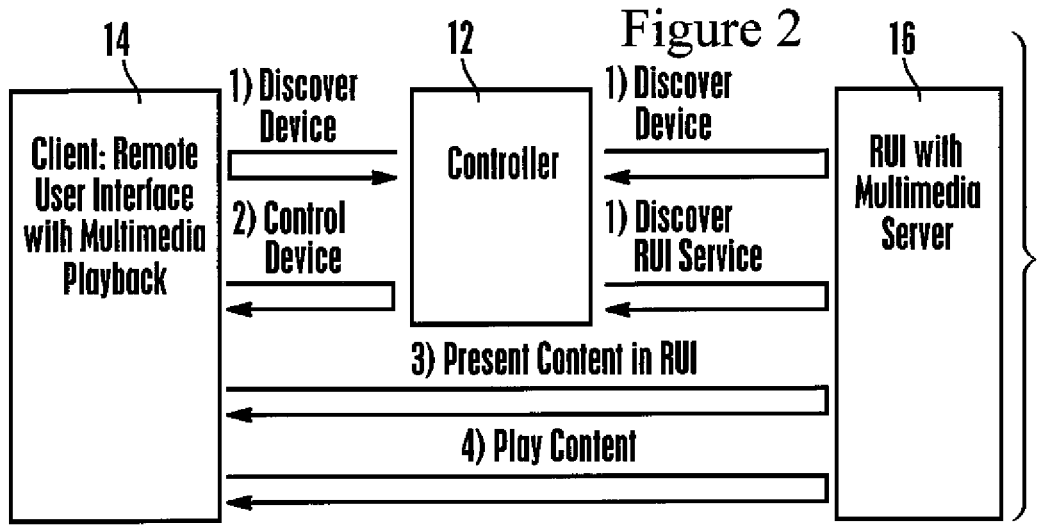
FIG. 2 is a message flow diagram illustrating message flows in a first architecture.
Figure 3:
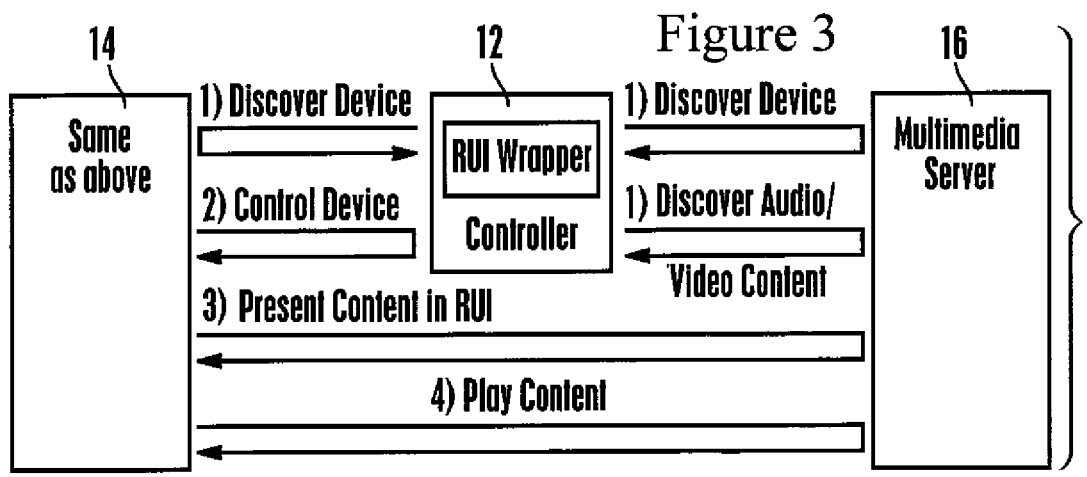
FIG. 3 is a message flow diagram illustrating message flow in a second architecture.

FIG. 2 illustrates the case where device discovery is executed using, e.g., UPnP, in which the server 16 has only discoverable AV, which is discovered by the controller 12 in step (1), not a remote UI. Accordingly, the controller 12 acts as the source of the remote UI in which is wrapped the content list, which is then delivered to the client (step 2). The content list is presented in the remote UI at the client device at step (3). The AV is pulled by the client 14 from the server 16 in step (4). The controller application can optionally also act as the device remote control for user input where the control is either through the network (using UPnP processInput actions for instance) or through infrared, Bluetooth and other wireless technologies.

In some examples embodiments of this is the home network connected TV use case. This includes but is not limited to interoperability in the DLNA ecosystem of devices and services, recognizing that the trend for future TV content and services to be delivered through home networks is to leverage the ubiquity and preference of supporting HTML5 user agents (e.g., browsers) on clients. HTML5 user agents offer video playback though a HTMLVideo element that is enabled by an application that runs on it.

The controller 12 described above solves the complexity issue by leveraging the fact that if the HTML5 user agent on the client 14 can be standardized to include playback of DLNA content, and if all content can be presented through a remote user interface, then the client need support one application and thus provide a single seamless user experience to access all the content in the home. In addition, when the remote user interface that wraps the content is based in HTML5 many different skins and presentation techniques are possible to allow user experiences to evolve and improve quickly, since HTML, CSS and JavaScript are the familiar tools of the manifold web development communities.

While the particular HOME NETWORK CONTROLLER WITH REMOTE USER INTERFACE WRAPPER OF DISCOVERED MULTIMEDIA CONTENT is herein shown and described in detail, it is to be understood that the subject matter which is encompassed by the present invention is limited only by the claims.

What is claimed is:

1. A controller comprising:
   at least one computer usable memory that is not a signal and having instructions which instructions when executed by at least one processor configure the processor to:
   adapt different sources of content to a client device on a network through a single user interface (UI) provided by the controller to the client device to transparently enable the client device to also receive content for playback that was initially presented without a remote UI, wherein at least a first source of content provides no remote UI and provides only AV content, and the instructions when executed by the processor configure the processor to:
   store the remote UI;
   discover the AV content on the first source of content, and wrap at least a content list representing the content in the remote UI prior to providing the remote UI along with the content list wrapped therein to the client device.

2. The controller of claim 1, wherein the controller is embodied by the client device.

3. The controller of claim 1, wherein the controller is physical separate from the client device.

4. The controller of claim 1, wherein the instructions when executed by the processor configure the processor to:
   transform multimedia content into content which is wrapped in the remote UI such that multimedia content is embedded in the remote UI.

5. The controller of claim 1, wherein the instructions when executed by the processor configure the controller to combine discovery functionality for discovering multimedia content with remote UI serving device functionality so that playback of the multimedia content is achieved on client service applications that only handle multimedia content offered as part of a remote UI.

6. The controller of claim 1, wherein the remote UI is a discoverable web browser with audio video (AV) playback.

7. The controller of claim 1, wherein the instructions when executed by the processor configure the processor to receive, from the source of content, the remote UI.

8. The controller of claim 1, further comprising the at least one processor.

* * * * *